US010699127B1

(12) United States Patent
Tian et al.

(10) Patent No.: US 10,699,127 B1
(45) Date of Patent: Jun. 30, 2020

(54) METHOD AND APPARATUS FOR ADJUSTING PARAMETER

(71) Applicants: Baidu.com Times Technology (Beijing) Co., Ltd., Beijing (CN); Baidu USA LLC, Sunnyvale, CA (US)

(72) Inventors: Hao Tian, Sunnyvale, CA (US); Daming Lu, Sunnyvale, CA (US); Xi Chen, Sunnyvale, CA (US); Jeff ChienYu Wang, Sunnyvale, CA (US)

(73) Assignees: Baidu.com Times Technology (Beijing) Co., Ltd., Beijing (CN); Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 16/702,908

(22) Filed: Dec. 4, 2019

(30) Foreign Application Priority Data

Apr. 8, 2019 (CN) .......................... 2019 1 0277782

(51) Int. Cl.
*H04N 9/80* (2006.01)
*G06K 9/00* (2006.01)
*G06F 40/169* (2020.01)
*G06K 9/62* (2006.01)

(52) U.S. Cl.
CPC ....... *G06K 9/00731* (2013.01); *G06F 40/169* (2020.01); *G06K 9/00744* (2013.01); *G06K 9/6256* (2013.01)

(58) Field of Classification Search
CPC ............. G06K 9/00731; G06K 9/6256; G06K 9/00744; G06F 40/169
USPC ....................................................... 386/241
See application file for complete search history.

(56) References Cited

U.S. PATENT DOCUMENTS

| | | | |
|---|---|---|---|
| 8,250,605 B2 * | 8/2012 | Opaluch .............. | H04N 21/466 725/44 |
| 2007/0113181 A1 * | 5/2007 | Blattner .................. | G06F 3/011 715/706 |
| 2010/0094869 A1 * | 4/2010 | Ebanks ............. | G06F 16/24578 707/732 |
| 2015/0066959 A1 * | 3/2015 | Yi ....................... | G06F 16/9535 707/751 |
| 2016/0224672 A1 * | 8/2016 | Bindal ................ | G06F 16/9535 |
| 2017/0060870 A1 * | 3/2017 | Checkley .......... | G06F 16/24578 |
| 2017/0171139 A1 * | 6/2017 | Marra ..................... | H04L 51/32 |

* cited by examiner

*Primary Examiner* — Helen Shibru
(74) *Attorney, Agent, or Firm* — Knobbe, Martens, Olson & Bear, LLP

(57) ABSTRACT

A method and apparatus for adjusting a parameter are provided. The method may include: acquiring a current value of at least one parameter which is in a process of generating a video corresponding to a commentary of the news cluster based on a news cluster; determining a video evaluation score of the video which is generated based on the news cluster and according to the current value of the at least one parameter; performing feature extraction on the current value of the at least one parameter to obtain a feature representation;
inputting the feature representation and the determined video evaluation score into a pre-trained evaluation network to obtain a predicted video evaluation score; inputting the feature representation and the predicted video evaluation score into a pre-trained operation network, to obtain current operation information; and adjusting the current value of the at least one parameter based on the current operation information.

20 Claims, 7 Drawing Sheets

METHOD AND APPARATUS FOR ADJUSTING PARAMETER

CROSS-REFERENCE TO RELATED APPLICATIONS

This application claims priority to Chinese Patent Application No. 201910277782.6, filed with the China National Intellectual Property Administration (CNIPA) on Apr. 8, 2019, the content of which is incorporated herein by reference in its entirety.

TECHNICAL FIELD

Embodiments of the present disclosure relate to the field of computer technology, and specifically to a method and apparatus for adjusting a parameter.

BACKGROUND

With the development of network technology, all sorts of news throughout the world may be issued to users via various kinds of media. Fora given news event, various kinds of media (such as a news website or a news application) will edit different news, and the news issued by different media will have different focuses to a certain extent, but various news reporting the given news event will also have more or less overlapped information.

The users may need to extract desired information only after reading a plurality of news reports, thus resulting in a low efficiency in acquiring news by the users. To help the users to improve the efficiency in acquiring news, a plurality of pieces of news of the given news event may be gathered, redundant information in the plurality of pieces of news may be removed, and a commentary directing to the news event may be extracted.

SUMMARY

Embodiments of the present disclosure provide a method and apparatus for adjusting a parameter.

According to a first aspect, some embodiments of the present disclosure provide a method for adjusting a parameter, the method including: acquiring a current value of at least one parameter, the at least one parameter being in a process of generating a video corresponding to a commentary of a news cluster based on the news cluster; determining a video evaluation score of the video, the video being generated based on the news cluster and according to the current value of the at least one parameter; performing feature extraction on the current value of the at least one parameter, to obtain a feature representation; inputting the feature representation and the determined video evaluation score into a pre-trained evaluation network, to obtain a predicted video evaluation score; inputting the feature representation and the predicted video evaluation score into a pre-trained operation network, to obtain current operation information; and adjusting the current value of the at least one parameter based on the current operation information.

In some embodiments, after the adjusting the current value of the at least one parameter, the method further includes: generating a video corresponding to a commentary of a target news cluster based on the current value of the at least one parameter.

In some embodiments, the operation network and the evaluation network are obtained by pre-training through following training: determining a network structure of an initial operation network, and initializing network parameters of the initial operation network; determining a network structure of an initial evaluation network, and initializing network parameters of the initial evaluation network; initializing the current value of the at least one parameter; executing following parameter adjusting until a preset training termination condition is satisfied: performing feature extraction on the current value of the at least one parameter, to obtain a sample feature representation; acquiring an annotated video evaluation score corresponding to the current value of the at least one parameter, wherein the acquired annotated video evaluation score is a video evaluation score of the video generated based on the news cluster and according to the current value of the at least one parameter; inputting the sample feature representation and the annotated video evaluation score into the initial evaluation network, to obtain a sample predicted video evaluation score; inputting the sample feature representation and the sample predicted video evaluation score into the initial operation network, to obtain predicted operation information; adjusting the current value of the at least one parameter based on the predicted operation information; and adjusting network parameters of the evaluation network based on a difference between the sample predicted video evaluation score and the acquired annotated video evaluation score, and adjusting network parameters of the operation network with maximizing the acquired annotated video evaluation score as an optimization target; and determining the initial operation network and the initial evaluation network for use as a pre-trained operation network and a pre-trained evaluation network respectively.

In some embodiments, the method further includes: sending, in response to receiving a playing request for instructing to play the video corresponding to the commentary of the target news cluster sent by a terminal device, the video corresponding to the commentary of the target news cluster to the terminal device.

In some embodiments, after sending the video corresponding to the commentary of the target news cluster to the terminal device, the method further includes: controlling the terminal device to present the received video.

In some embodiments, the determining a video evaluation score of the video generated based on the news cluster and according to the current value of the at least one parameter includes: acquiring pieces of watching behavior information of at least one user watching at least one target video, wherein the target video is the video generated based on the news cluster and according to the current value of the at least one parameter; for each piece of the acquired watching behavior information, determining a video evaluation score corresponding to the piece of watching behavior information; and determining an average value of determined video evaluation scores for use as the video evaluation score of the video generated based on the news cluster and according to the current value of the at least one parameter.

In some embodiments, a piece of watching behavior information may include at least one of the following items: a video identifier, a user identifier, a user profile, whether the video is switched on, a total video watching duration, or a video playing duration when the video is switched off.

According to a second aspect, some embodiments of the present disclosure provide an apparatus for adjusting a parameter, the apparatus includes: a current parameter value acquiring unit configured to acquire a current value of at least one parameter, the at least one parameter being in a process of generating a video corresponding to a commentary of a news cluster based on the news cluster; a video evaluation score determining unit configured to determine a video evaluation score of the video, the video being generated based on the news cluster and according to the current value of the at least one parameter; a feature extracting unit configured to perform feature extraction on the current value of the at least one parameter, to obtain a feature representation; a first inputting unit configured to input the feature representation and the determined video evaluation score into a pre-trained evaluation network, to obtain a predicted video evaluation score; a second inputting unit configured to input the feature representation and the predicted video evaluation score into a pre-trained operation network to obtain current operation information; and an adjusting unit configured to adjust the current value of the at least one parameter based on the current operation information.

In some embodiments, the apparatus further includes: a video generating unit configured to generate a video corresponding to a commentary of a target news cluster based on the current value of the at least one parameter, after the adjusting the current value of the at least one parameter.

In some embodiments, the operation network and the evaluation network are obtained by pre-training through following training: determining a network structure of an initial operation network, and initializing network parameters of the initial operation network; determining a network structure of an initial evaluation network, and initializing network parameters of the initial evaluation network; initializing the current value of the at least one parameter; executing following parameter adjusting until a preset training termination condition is satisfied: performing feature extraction on the current value of the at least one parameter, to obtain a sample feature representation; acquiring an annotated video evaluation score corresponding to the current value of the at least one parameter, wherein the acquired annotated video evaluation score is a video evaluation score of the video generated based on the news cluster and according to the current value of the at least one parameter; inputting the sample feature representation and the annotated video evaluation score into the initial evaluation network, to obtain a sample predicted video evaluation score; inputting the sample feature representation and the sample predicted video evaluation score into the initial operation network, to obtain predicted operation information; adjusting the current value of the at least one parameter based on the predicted operation information; and adjusting network parameters of the evaluation network based on a difference between the sample predicted video evaluation score and the acquired annotated video evaluation score, and adjusting network parameters of the operation network with maximizing the acquired annotated video evaluation score as an optimization target; and determining the initial operation network and the initial evaluation network for use as a pre-trained operation network and a pre-trained evaluation network respectively.

In some embodiments, the apparatus further includes: a video sending unit configured to send, in response to receiving a playing request for instructing to play the video corresponding to the commentary of the target news cluster sent by a terminal device, the video corresponding to the commentary of the target news cluster to the terminal device.

In some embodiments, the apparatus further includes: a controlling unit configured to control, after the sending the video corresponding to the commentary of the target news cluster to the terminal device, the terminal device to present the received video.

In some embodiments, the video evaluation score determining unit includes: a watching behavior information acquiring module configured to acquire pieces of watching behavior information of at least one user watching at least one target video, wherein the target video is the video generated based on the news cluster and according to the current value of the at least one parameter; a first determining module configured to determine, for each piece of the acquired watching behavior information, a video evaluation score corresponding to the piece of watching behavior information; and a second determining module configured to determine an average value of determined video evaluation scores for use as the video evaluation score of the video generated based on the news cluster and according to the current value of the at least one parameter.

In some embodiments, apiece of the watching behavior information may include at least one of the following items: a video identifier, a user identifier, a user profile, whether the video is switched on, a total video watching duration, or a video playing duration when the video is switched off.

According to a third aspect, some embodiments of the present disclosure provide a server, including: one or more processors; and a storage apparatus, storing one or more programs thereon, where the one or more programs, when executed by the one or more processors, cause the one or more processors to implement the method according to any one of the implementations in the first aspect.

According to a fourth aspect, some embodiments of the present disclose provides a computer readable storage medium, storing a computer program thereon, where the computer program, when executed by one or more processors, implements the method according to any one of the implementations in the first aspect.

According to a fifth aspect, some embodiments of the present disclosure provide anther server, including: an interface; a memory storing one or more programs thereon; and one or more processors operably connected to the interface and the memory, for: acquiring a current value of at least one parameter, the at least one parameter being in a process of generating a video corresponding to a commentary of a news cluster based on the news cluster; determining a video evaluation score of the video, the video being generated based on the news cluster and according to the current value of the at least one parameter; performing feature extraction on the current value of the at least one parameter, to obtain a feature representation; inputting the feature representation and the determined video evaluation score into a pre-trained evaluation network, to obtain a predicted video evaluation score; inputting the feature representation and the predicted video evaluation score into a pre-trained operation network, to obtain current operation information; and adjusting the current value of the at least one parameter based on the current operation information.

According to a sixth aspect, some embodiments of the present disclosure provide a computer readable storage medium, storing a computer program thereon, wherein the computer program, when executed by one or more processors, cause the one or more processors to: acquire a current value of at least one parameter, the at least one parameter being in a process of generating a video corresponding to a commentary of a news cluster based on the news cluster; determine a video evaluation score of the video, the video being generated based on the news cluster and according to the current value of the at least one parameter; perform feature extraction on the current value of the at least one parameter, to obtain a feature representation; input the feature representation and the determined video evaluation score into a pre-trained evaluation network, to obtain a predicted video evaluation score; input the feature representation and the predicted video evaluation score into a pre-trained operation network, to obtain current operation information; and adjust the current value of the at least one parameter based on the current operation information.

To improve the users' efficiency in acquiring news, the prior art will often generate a commentary for a news cluster, the users need to read the commentary in a literal form to acquire a news abstract, and no corresponding video is generated for the commentary. The method and apparatus for adjusting a parameter according to some embodiments of the present disclosure first acquire a current value of at least one parameter, the at least one parameter being in a process of generating a video corresponding to a commentary of the news cluster based on a news cluster, then determine a video evaluation score of the video which is generated based on the news cluster and according to the current value of the at least one parameter, then perform feature extraction on the current value of the at least one parameter to obtain a feature representation, then input the feature representation and the determined video evaluation score into a pre-trained evaluation network to obtain a predicted video evaluation score, then input the feature representation and the predicted video evaluation score into a pre-trained operation network to obtain current operation information, and finally adjust the current value of the at least one parameter based on the current operation information, thereby achieving adjusting the at least one parameter based on the video evaluation score of the video corresponding to the commentary generated for the news cluster in the video generating process, and further improving video evaluation on the video corresponding to the commentary of the news cluster subsequently generated based on the adjusted parameter.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
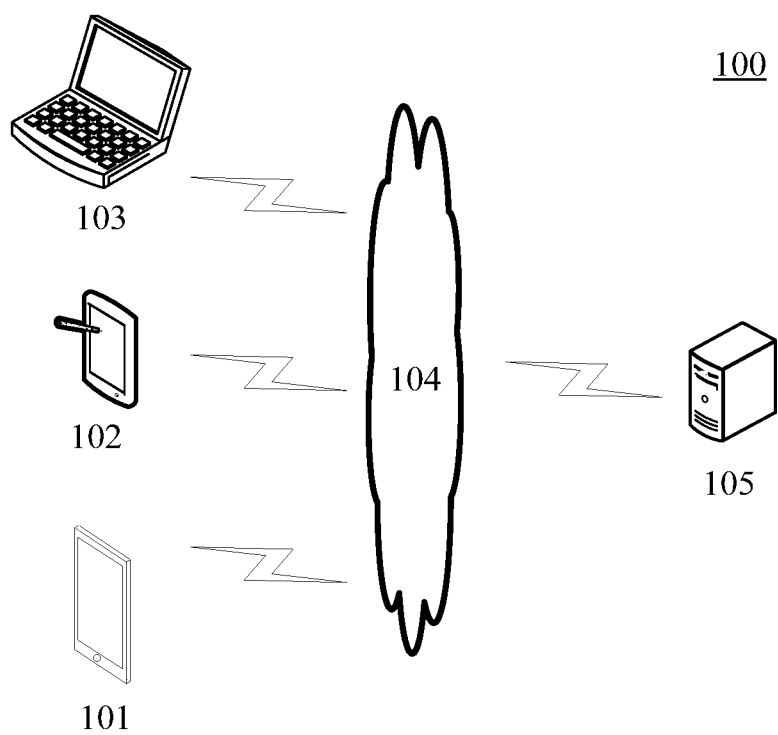
FIG. 1 is a diagram of an example system architecture in which embodiments of the present disclosure may be implemented.

FIG. 1 shows an example system architecture 100 in which a method for adjusting a parameter or an apparatus for adjusting a parameter of embodiments of present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 using the terminal devices 101, 102, and 103 via the network 104, e.g., to receive or send a message. The terminal devices 101, 102, and 103 may be provided with various communication client applications, such as a web browser application, a shopping application, a search application, an instant messaging tool, an email client, and social platform software.

The terminal devices 101, 102, and 103 may be hardware or software. When the terminal devices 101, 102 and 103 are hardware, the terminal devices may be various electronic devices having a display screen, including but not limited to a smart phone, a tablet computer, an e-book reader, an MP3 (Moving Picture Experts Group Audio Layer III) player, an MP4 (Moving Picture Experts Group Audio Layer IV) player, a laptop portable computer, a desktop computer, and the like. When the terminal devices 101, 102, and 103 are software, the terminal devices may be installed in the above-listed electronic devices, or be implemented as a plurality of software programs or software modules, or be implemented as a single software program or software module. This is not specifically limited here.

The server 105 may be a server providing various services, such as a back-end website server providing support for a news website displayed on the terminal devices 101, 102, and 103. The back-end website server may process, e.g., analyze, data such as a received news page request, and return the processing result (e.g., page data of news webpages) to the terminal devices.

It should be noted that the method for adjusting a parameter according to some embodiments of the present disclosure is generally executed by the server 105. Accordingly, the apparatus for adjusting a parameter is generally provided in the server 105.

It should be noted that the server 105 may be hardware or software. When the server 105 is hardware, the server may be implemented as a distributed server cluster composed of a plurality of servers, or be implemented as a single server. When the server 105 is software, the server maybe implemented as a plurality of software programs or software modules (e.g., software programs or software modules for providing page services of the news webpages), or be implemented as a single software program or software module. This is not specifically limited here.

It should be understood that the numbers of terminal devices, networks, and servers in FIG. 1 are merely illustrative. Any number of terminal devices, networks, and servers may be provided based on actual requirements.

Figure 2:
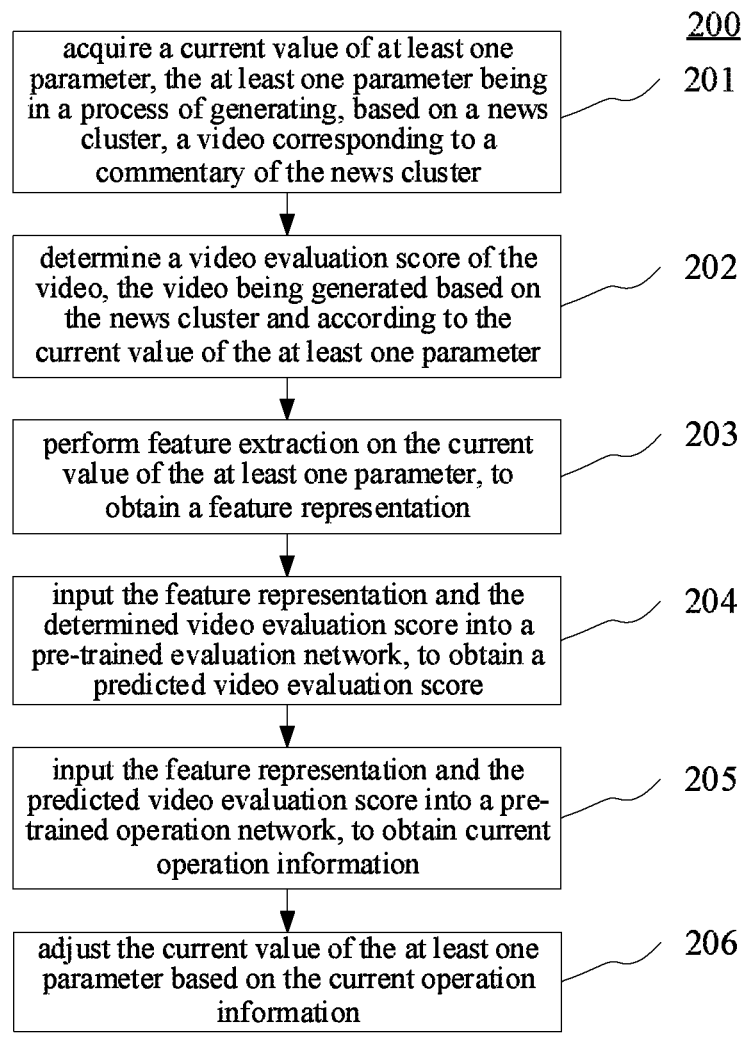
FIG. 2 is a flowchart of a method for adjusting a parameter according to an embodiment of the present disclosure.

Further referring to FIG. 2, a process 200 of a method for adjusting a parameter according to an embodiment of the present disclosure is shown. The method for adjusting a parameter includes the following steps:

Step 201: acquiring a current value of at least one parameter, the at least one parameter being in a process of generating, based on a news cluster, a video corresponding to a commentary of the news cluster.

In the present embodiment, an executing body (e.g., the server shown in FIG. 1) of the method for adjusting a parameter may acquire the current value of the at least one parameter, the at least one parameter being in the process of generating, based on the news cluster, the video corresponding to the commentary of the news cluster, locally or remotely from other electronic devices connected to the executing body via a network.

Here, pieces of news in a news cluster direct to a given news event, and different news clusters direct to different news events. The news event may be an event taking place within a recent first preset duration (e.g., within three months).

Here, a piece of news maybe electronic data directing to the news event in various forms, and a piece of news may be marked with corresponding generation time accordingly. The news may include at least one of the following items: a text, an image, an audio, or a video. For example, the news may be a webpage, or various documents. The document may include at least one of the following items: a text, an image, an audio, or a video. The news may further be merely a text, an image, or a video.

In practice, a piece of acquired news may be marked with a corresponding news event. Thus, the executing body may first acquire pieces of news generated within a recent second preset duration (e.g., within one day), and then form the acquired at least one piece of news into different news clusters based on corresponding different news events.

It will be appreciated that, when pieces of acquired news are not marked with corresponding news events, the executing body may first acquire pieces of news generated within the recent second preset duration (e.g., within one day), then cluster the acquired pieces of news by various implementations. Pieces of news cluster clustered into a given category form one cluster, pieces of news not clustered into one category belongs to different news clusters, and then at least one news cluster is obtained. For example, in practice, news will generally have a news headline. The executing body may cluster news headlines of pieces of acquired news, and use a cluster of news headlines as a cluster of news corresponding to the news headlines.

Because pieces of news in the news cluster direct to a given news event, in order to improve the user's efficiency in acquiring news, a video corresponding to the commentary of the news cluster may be generated based on the news cluster by various implementations. In the process of generating the video corresponding to the commentary of the news cluster based on the news cluster, some parameters will be involved, values of the parameters are different, the generated video will also be different, and then an evaluation of the user watching the generated video will also be different. In order that the user would like to watch the generated video, parameter values of the at least one parameter in the process of generating the video corresponding to the commentary of the news cluster based on the news cluster may be adjusted, such that the user would like to watch the video corresponding to the commentary of the news cluster generated based on the news cluster. Here, the current value of the at least one parameter, the at least one parameter being in the process of generating the video corresponding to the commentary of the news cluster based on the news cluster may be first acquired.

As an example, the at least one parameter may include at least one of the following items: preference indexes of categories of at least one preset news category, a preset playing duration of an image type material resource in the video, a preset fastest speech rate in a speech synthesis process, a longest playing duration of a to-be-generated video, a preset shortest playing duration of a video type material resource, or a minimum matching degree threshold of a matching degree between a candidate material resource and the commentary.

Step 202: determining a video evaluation score of the video, the video being generated based on the news cluster and according to the current value of the at least one parameter.

In the present embodiment, the executing body may determine the video evaluation score of the video which is generated based on the news cluster and according to the current value of the at least one parameter. Here, the video evaluation score of the video reflects a comprehensive score of user's evaluation on various aspects of the video. For example, the video evaluation score may reflect at least one of the following items: whether the user would like to watch the video, a matching degree between the generated video and the commentary, a matching degree between the generated video and a manually clipped video, or a matching degree between the generated video and the news event to which the news cluster direct.

In some alternative implementations of the present embodiment, the user may be provided, on the executing body or the other electronic devices connected to the executing body via the network, with a user interface for evaluating the video which is generated based on the news cluster and according to the current value of the at least one parameter. Then, the executing body may receive an evaluation score inputted by the user for the video which is generated based on of the news cluster and according to the current value of the at least one parameter on the user interface locally or remotely from the electronic device. Thus, the executing body may acquire the video evaluation score of at least one user watching the video which is generated based on the news cluster and according to the current value of the at least one parameter, and then determine an average value of the acquired video evaluation scores as the video evaluation score of the video which is generated based on the news cluster and according to the current value of the at least one parameter.

In some alternative implementations of the present embodiment, step 202 may also be performed as follows:

First, watching behavior information of the at least one user watching at least one target video is acquired. Here, a target video is a video generated based on the news cluster and according to the current value of the at least one parameter. The watching behavior information is used for characterizing various behaviors of the user in a process of watching the target video.

In some implementations, the watching behavior information may include at least one of the following items: a video identifier, a user identifier, a user profile, an identifier on whether the video is switched on, a total duration of the video being watching, or duration of the video being played when the video is switched off. The video identifier is used for uniquely indicating the video which is generated based on the news cluster an according to d the current value of the at least one parameter. The user identifier is used for uniquely indicating the user who is watching the video which is generated based on the news cluster and according to the current value of the at least one parameter. The user profile is used for describing various user related information, for example, the user profile may include, but is not limited to, user's gender, age, hobbies, birth place, work place, living place, occupation, consumption habits, living habits, and so on. The identifier of whether the video is switched on is used for indicating whether the user indicated by the user identifier switches on the video indicated by the video identifier. The total video watching duration is used for indicating a total duration of the user indicated by the user identifier watching the video indicated by the video identifier. The video playing duration when the video is switched off is used for indicating a current playing duration of the video when the user indicated by the user identifier switches off the video indicated by the video identifier.

Then, for each piece of the acquired watching behavior information, a video evaluation score corresponding to the piece of watching behavior information is determined.

Here, for each piece of the acquired watching behavior information, the video evaluation score corresponding to the piece of watching behavior information may be determined by various implementations.

In some implementations, a corresponding weight may be preset for each item related to video evaluation in the watching behavior information, then a weighted summation of values of items related to video evaluation in the watching behavior information and the corresponding weights may be calculated, and the weighted summation may be determined as the video evaluation score corresponding to the piece of watching behavior information. For example, when the identifier of whether the video is switched on is 0, it indicates that the user does not switch on the video, while when the identifier of whether the video is switched on is 1, it indicates that the user switches on the video, then a weight corresponding to the identifier of whether the video is switched on may be provided, such that the identifier of whether the video is switched on is positively correlated with the video evaluation score. For another example, a weight corresponding to the total video watching duration may be provided, such that the total video watching duration is positively correlated with the video evaluation score, and a weight corresponding to the video playing duration when the video is switched off may be provided, such that the video playing duration when the video is switched off is positively correlated with the video evaluation score. For still another example, when the watching behavior information may include an identifier of whether the video is forwarded, an identifier of whether a thumb-up is given, and the like for indicating the user likes the video and then makes a corresponding operation of liking the video, similar to the identifier of whether the video is switched on, when the identifier of whether the video is forwarded is 0, it indicates that the user does not forward the video, while when the identifier of whether the video is forwarded is 1, it indicates that the user forwards the video, a weight corresponding to the identifier of whether the video is forwarded may be provided such that the identifier of whether the video is forwarded is positively correlated with the video evaluation score. The same operation may also be applied to the identifier of whether a thumb-up is given. The description will not be repeated here.

In some implementations, a ratio of the total video watching duration to the total playing duration of the video indicated by the video identifier may be further determined as the video evaluation score corresponding to the piece of watching behavior information.

Finally, an average value of the determined video evaluation scores is determined as the video evaluation score of the video which is generated based on the news cluster and according to the current value of the at least one parameter.

Step 203: performing feature extraction on the current value of the at least one parameter, to obtain a feature representation.

In the present embodiment, the executing body may perform feature extraction on the current value of the at least one parameter to obtain the feature representation by various implementations. Here, the feature representation may be in various forms. For example, the feature representation may be in a vector form, i.e., an eigenvector. In practice, in relative to the current value of the at least one parameter, the feature representation presents characteristics of lower dimension and computability.

It will be appreciated that, due to different parameters are involved in the process of generating the video corresponding to the commentary of the news cluster, the method of feature extraction on the current value of the at least one parameter may also be different. For example, feature extraction may be performed by principal component analysis (PCA), independent component analysis (ICA), linear discriminant analysis (LDA), or the like.

Step 204: inputting the feature representation and the determined video evaluation score into a pre-trained evaluation network, to obtain a predicted video evaluation score.

In the present embodiment, the executing body may input the feature representation generated in step 203 and the determined video evaluation score into a pre-trained evaluation network to obtain a predicted video evaluation score. The evaluation network may be an artificial neural network (ANN). It should be noted that the evaluation network is used for characterizing a corresponding relationship between the both of the feature representation and the video evaluation score and the predicted video evaluation score.

Step 205: inputting the feature representation and the predicted video evaluation score into a pre-trained operation network to obtain current operation information.

In the present embodiment, the executing body may input the feature representation generated in step 203 and the predicted video evaluation score generated in step 204 into a pre-trained operation network to obtain the current operation information. Here, the operation network may also be the artificial neural network. It should be noted that the operation network is used for characterizing the corresponding relationship between both of the feature representation and the video evaluation score and operation information. Here, the operation information is used for indicating how to adjust the current value of the at least one parameter which is in the process of generating the video corresponding to the commentary of the news cluster based on the news cluster.

Figure 3:
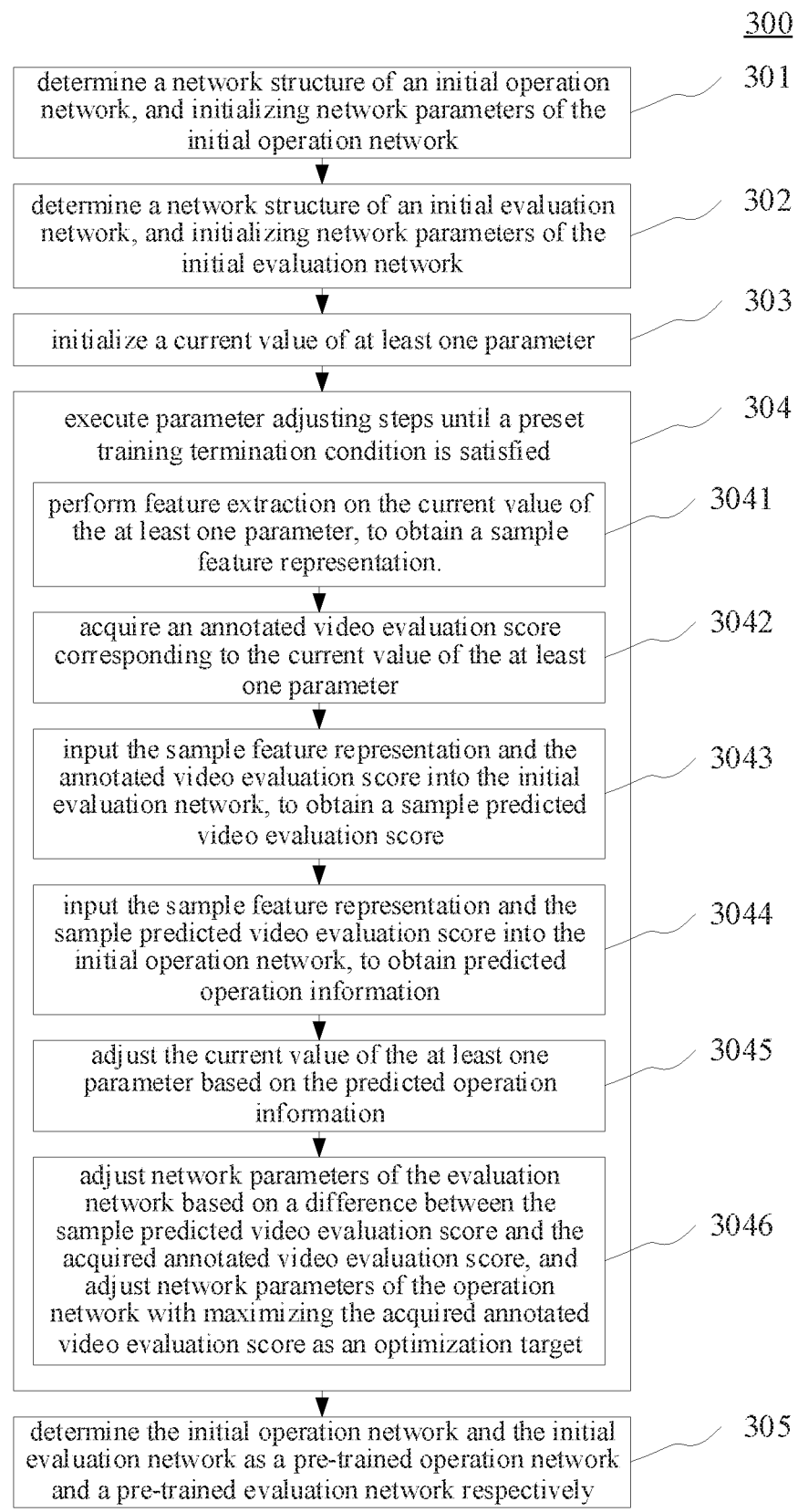
FIG. 3 is a flowchart of training according to an embodiment of the present disclosure.

In some implementations, the above operation network and evaluation network may be obtained by pre-training through training. Referring to FIG. 3, FIG. 3 shows a process 300 of training of pre-training a operation network and an evaluation network according to an embodiment of the present disclosure. The training may include the following step 301 to step 305.

Step 301: determining a network structure of an initial operation network, and initializing network parameters of the initial operation network.

Here, an executing body of the training may be identical to or different from the executing body of the method for adjusting a parameter. If the executing body of the training is identical to the executing body of the method for adjusting a parameter, then the executing body of the training may store, after obtaining the operation network and the evaluation network by training, network structure information and parameter values of the network parameters of the trained operation network and the trained evaluation network locally. If the executing body of the training is different from the executing body of the method for adjusting a parameter, then the executing body of the training may send, after obtaining the operation network and the evaluation network by training, network structure information and parameter values of the network parameters of the trained operation network and the trained evaluation network to the executing body of the method for adjusting a parameter.

Here, the executing body of the training may first determine the network structure of the initial operation network. Here, the initial operation network may be an artificial neural network. Here, which layers are included in the initial operation network, a connection relationship between the layers, which neurons are included in each layer, weights and biases corresponding to the neurons, activation function of each layer, and the like may be determined. It will be appreciated that the initial operation network may include various types of neural networks. For different types of neural networks, to-be-determined network structures are also different.

Then, the executing body of the training may initialize the network parameters of the initial operation network. In practice, each network parameter (e.g., weight and bias) of the initial operation network maybe initialized with some different small random numbers. The "small random number" is used to ensure that the network will not enter a saturation state due to very high weight, thus resulting in training failure. The "different" is used to ensure normal network learning.

Step 302: determining a network structure of an initial evaluation network, and initializing network parameters of the initial evaluation network.

Here, the executing body of the training may first determine the network structure of the initial evaluation network. Then, the executing body of the training may initialize the network parameters of the initial evaluation network.

Here, the initial evaluation network may also be an artificial neural network. Related description in step 301 may be referred to for how to determine a network structure of the artificial neural network and initialize network parameters of the artificial neural network. The description will not be repeated here.

Step 303: initializing a current value of at least one parameter.

Here, the executing body of the training may initialize the current value of the at least one parameter which is in a process of generating the video corresponding to the commentary of the news cluster based on the news cluster.

Step 304: executing parameter adjusting until a preset training termination condition is satisfied.

Here, the executing body of the training may execute the parameter adjusting until the preset training termination condition is satisfied, and the parameter adjusting may include sub-step 3041 to sub-step 3046.

Sub-step 3041: performing feature extraction on the current value of the at least one parameter, to obtain a sample feature representation.

Sub-step 3042: acquiring an annotated video evaluation score corresponding to the current value of the at least one parameter.

Here, the executing body of the training may acquire the annotated video evaluation score corresponding to the current value of the at least one parameter locally or remotely from other electronic devices connected to the executing body of the training via a network. Here, the annotated video evaluation score corresponding to the current value of the at least one parameter may be a video evaluation score which is, after the video generated on the basis of the news cluster according to the current value of the at least one parameter is watched, manually annotated for the watched video, where the video generated based on the news cluster and according to the current value of the at least one parameter may be generated by the executing body of the training, or be generated by the other electronic devices connected to the executing body of the training via the network.

Sub-step 3043: inputting the sample feature representation and the annotated video evaluation score into the initial evaluation network to obtain a sample predicted video evaluation score.

Here, the sample feature representation obtained in sub-step 3041 and the annotated video evaluation score obtained in sub-step 3042 may be inputted into the initial evaluation network, to obtain the sample predicted video evaluation score.

Sub-step 3044: inputting the sample feature representation and the sample predicted video evaluation score into the initial operation network to obtain predicted operation information.

Here, the sample feature representation obtained in sub-step 3041 and the sample predicted video evaluation score obtained in sub-step 3043 may be inputted into the initial operation network to obtain the predicted operation information.

Sub-step 3045: adjusting the current value of the at least one parameter based on the predicted operation information.

Here, the operation information is used for indicating how to adjust the current value of the at least one parameter which is in the process of generating the video corresponding to the commentary of the news cluster based on the news cluster. Then, here, the current value of the at least one parameter may be adjusted based on the predicted operation information obtained in sub-step 3044.

Sub-step 3046: adjusting network parameters of the evaluation network based on a difference between the sample predicted video evaluation score and the acquired annotated video evaluation score, and adjusting network parameters of the operation network with maximizing the acquired annotated video evaluation score as an optimization target.

Here, the network parameters of the evaluation network may be adjusted based on the difference between the sample predicted video evaluation score and the acquired annotated video evaluation score and the network parameters of the operation network may be adjusted with maximizing the acquired annotated video evaluation score as the optimization target by various implementations.

For example, stochastic gradient descent (SGD), Newton's method, quasi-Newton method, conjugate gradient, heuristic optimization, and various other optimization algorithms that are known at present or are to be developed in the future may be employed.

For example, the preset training termination condition may include at least one of the following: a training duration exceeds a third preset duration, the number of training exceeds a preset number of times, or the difference between the sample predicted video evaluation score and the acquired annotated video evaluation score is less than a preset difference threshold.

Step 305: determining the initial operation network and the initial evaluation network for use as a pre-trained operation network and a pre-trained evaluation network respectively.

After step 205, current operation information is obtained.

Step 206: adjusting the current value of the at least one parameter based on the current operation information.

In the present embodiment, the operation information is used for indicating how to adjust the current value of the at least one parameter which is in the process of generating the video corresponding to the commentary of the news cluster based on the news cluster. Then, the current operation information obtained in step 204 also includes how to adjust information of the current value of the at least one parameter which is in the process of generating the video corresponding to the commentary of the news cluster based on the news cluster. Then, in the present embodiment, the executing body may adjust the current value of the at least one parameter based on the current operation information by various implementations. For example, the current operation information may indicate how much numerical value is a current value of a certain parameter increased by or decreased by, a current value of a certain parameter is multiplied by a coefficient, or how much is current value of a certain parameter is directly set to, or the like.

After step 206, the current value of the at least one parameter which is in the process of generating the video corresponding to the commentary of the news cluster based on the news cluster is adjusted.

Figure 4:
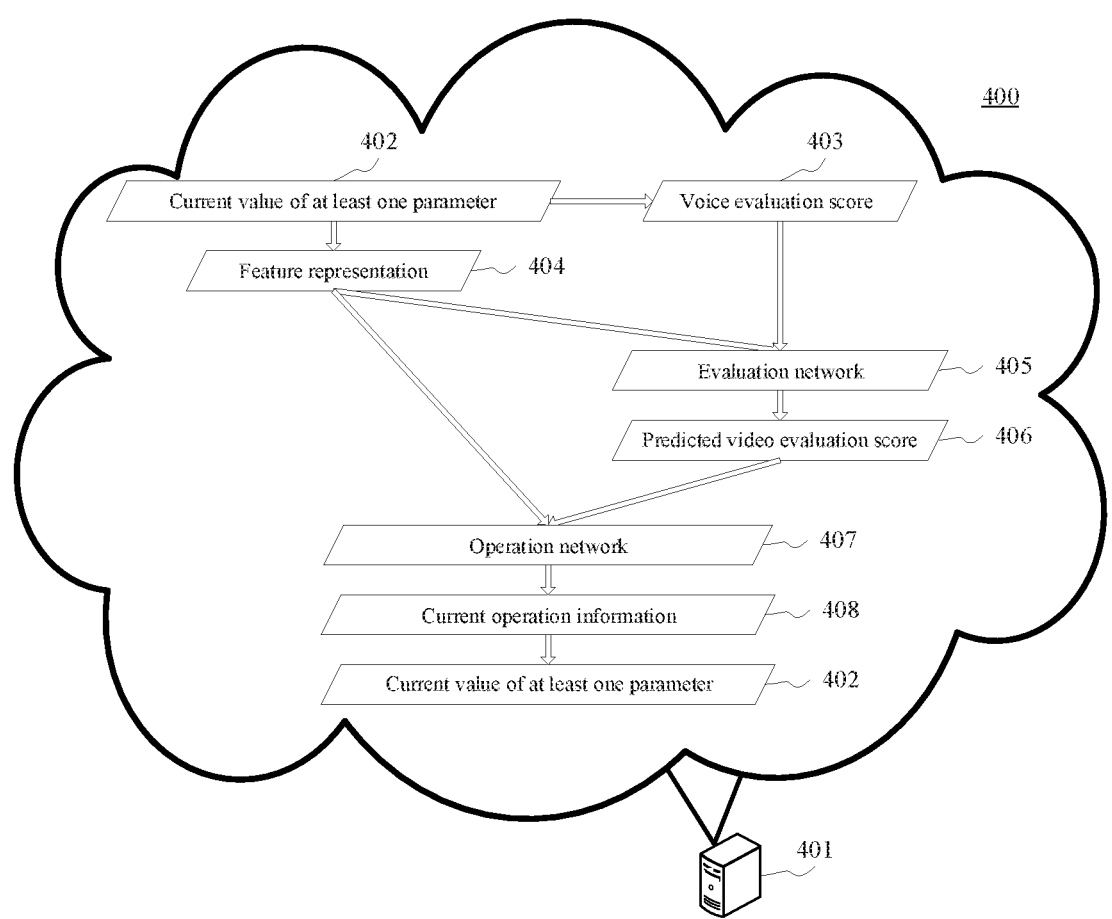
FIG. 4 is a schematic diagram of an application scenario of the method for adjusting a parameter according to an embodiment of the present disclosure.

Further referring to FIG. 4, FIG. 4 is a schematic diagram of an application scenario of the method for adjusting a parameter according to the present embodiment. In the application scenario of FIG. 4, a server 401 providing support for a news website may first acquire a current value 402 of at least one parameter which is in a process of generating, based on a news cluster, a video corresponding to a commentary of the news cluster, then the server 401 may further determine a video evaluation score 403 of the video generated based on the news cluster and according to the current value of the at least one parameter, then the server 401 may perform feature extraction on the current value 402 of the at least one parameter, to obtain a feature representation 404, then the server 401 may input the feature representation 404 and the determined video evaluation score 403 into a pre-trained evaluation network 405, to obtain a predicted video evaluation score 406, then the server 401 may input the feature representation 404 and the predicted video evaluation score 406 into a pre-trained operation network 407, to obtain current operation information 408, and finally the server 401 may adjust the current value 402 of the at least one parameter based on the current operation information 408.

The method according to the above embodiments of the present disclosure first acquires a current value of at least one parameter which is in a process of generating, based on a news cluster, a video corresponding to a commentary of the news cluster, then determines a video evaluation score of the video generated based on the news cluster and according to the current value of the at least one parameter, then performs feature extraction on the current value of the at least one parameter, to obtain a feature representation, then inputs the feature representation and the determined video evaluation score into a pre-trained evaluation network to obtain a predicted video evaluation score, then inputs the feature representation and the predicted video evaluation score into a pre-trained operation network to obtain current operation information, and finally adjusts the current value of the at least one parameter based on the current operation information, thereby achieving adjusting the at least one parameter which is in the video generating process based on the video evaluation score of the video corresponding to the commentary generated for the news cluster, and further improving video evaluation on the video corresponding to the commentary of the news cluster subsequently generated based on the adjusted parameter.

Figure 5:
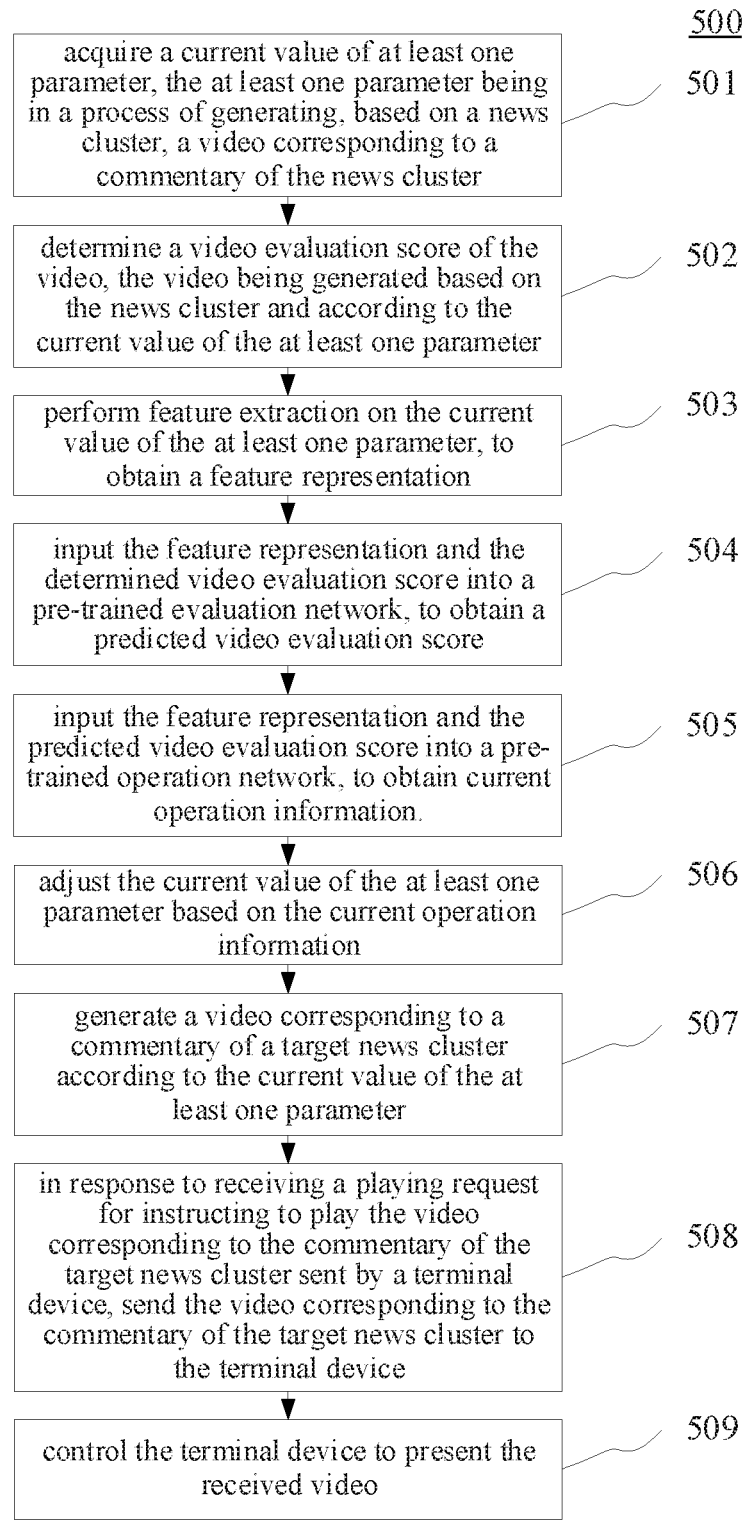
FIG. 5 is a flowchart of the method for adjusting a parameter according to another embodiment of the present disclosure.

Further referring to FIG. 5, a process 500 of the method for adjusting a parameter according to another embodiment is shown. The process 500 of the method for adjusting a parameter includes the following steps:

Step 501: acquiring a current value of at least one parameter, the at least one parameter being in a process of generating, based on a news cluster, a video corresponding to a commentary of the news cluster.

Step 502: determining a video evaluation score of the video, the video being generated based on the news cluster and according to the current value of the at least one parameter.

Step 503: performing feature extraction on the current value of the at least one parameter, to obtain a feature representation.

Step 504: inputting the feature representation and the determined video evaluation score into a pre-trained evaluation network, to obtain a predicted video evaluation score.

Step 505: inputting the feature representation and the predicted video evaluation score into a pre-trained operation network to obtain current operation information.

Step 506: adjusting the current value of the at least one parameter based on the current operation information.

Specific operations of step 501, step 502, step 503, step 504, step 505, and step 506 in the present embodiment are basically identical to the operations of step 201, step 202, step 203, step 204, step 205, and step 206 in the embodiment shown in FIG. 2. The description will not be repeated here.

Step 507: generating a video corresponding to a commentary of a target news cluster according to the current value of the at least one parameter.

In the present embodiment, an executing body (e.g., the server shown in FIG. 1) of the method for adjusting a parameter may generate the video corresponding to the commentary of the target news cluster based on the current value of the at least one parameter adjusted in step 506.

Here, the target news cluster may be any commentary specific to a given news event. This is not specifically limited in the present disclosure.

The video corresponding to the commentary of the target news cluster may be generated in various processes. This is not specifically limited in the present disclosure, either. It will be appreciated that, here, the process of generating the video corresponding to the commentary of the target news cluster may be identical to the process of generating the video corresponding to the commentary of the news cluster based on the news cluster described in step 501 to step 506, and the involved parameters may also be identical. Because the parameter values of the at least one parameter have been adjusted in step 506, the adjusted parameter is optimized than the parameter before adjustment. Moreover, as can be known from the optimization target of the operation network and the evaluation network, the video evaluation score of the video corresponding to the commentary of the target news cluster generated based on the adjusted parameter will be higher than the video evaluation score of the video corresponding to the commentary of the target news cluster generated based on the parameter before adjustment.

Step 508: in response to receiving a playing request for instructing to play the video corresponding to the commentary of the target news cluster sent by a terminal device, sending the video corresponding to the commentary of the target news cluster to the terminal device.

In the present embodiment, the executing body may send the video corresponding to the commentary of the target news cluster to the terminal device, in response to receiving the playing request for instructing to play the video corresponding to the commentary of the target news cluster generated in step 507 sent by the terminal device.

Step 509: controlling the terminal device to present the received video.

In the present embodiment, the executing body may control the terminal device to present the received video by various implementations. For example, the executing body may send a control instruction for controlling the terminal device to directly play the received video on the terminal device, to realize controlling the terminal device to directly play the received video.

As can be seen from FIG. 5, compared with the corresponding embodiment of FIG. 2, the process 500 of the method for adjusting a parameter in the present embodiment additionally adds the steps of: generating the video corresponding to the commentary of the target news cluster according to the current value of the at least one parameter, sending the video corresponding to the commentary of the target news cluster to the terminal device, in response to receiving a playing request for instructing to play the video corresponding to the commentary of the target news cluster sent by the terminal device, controlling the terminal device to present the received video. Accordingly, the scheme described in the present embodiment may control the terminal device to present the video corresponding to the commentary of the target news cluster generated after adjusting parameters of the video generating process. Users may watch a video corresponding to a commentary of a target news cluster with a higher video evaluation score on the terminal device, thus further extending the information presenting function of the terminal device.

Figure 6:
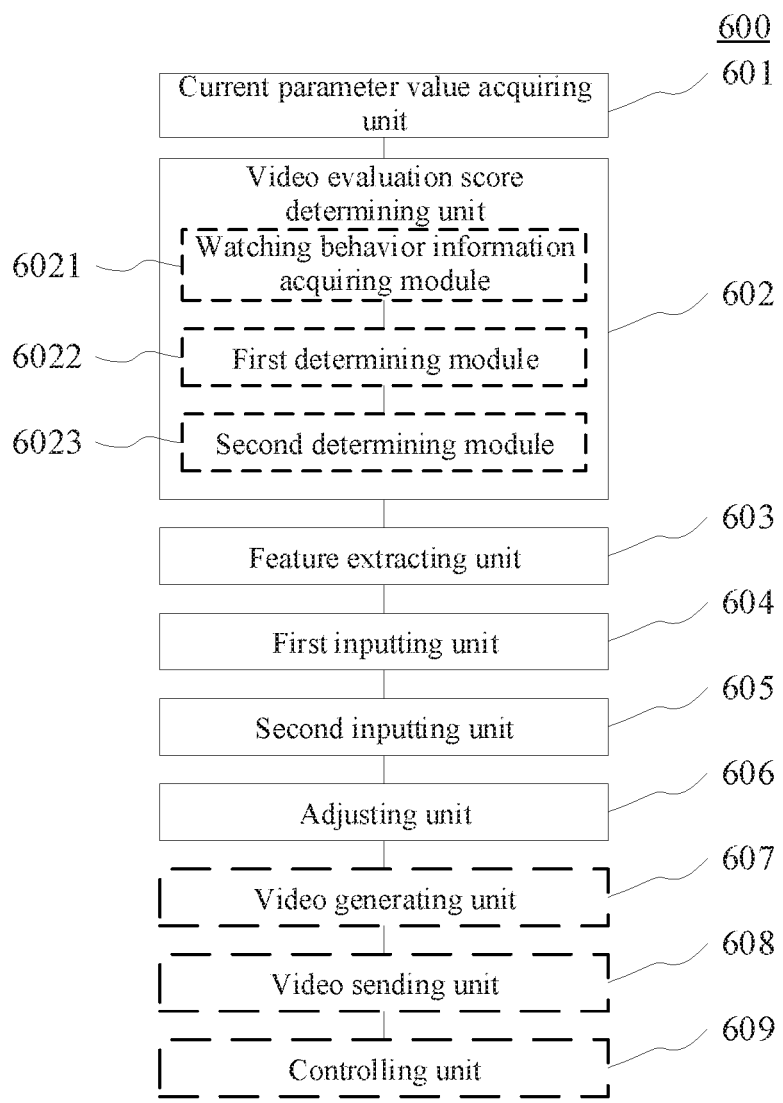
FIG. 6 is a schematic structural diagram of an apparatus for adjusting a parameter according to an embodiment of the present disclosure.

Further referring to FIG. 6, as an implementation of the method shown in the above figures, some embodiments of the present disclosure provide an apparatus for adjusting a parameter. The embodiments of the apparatus correspond to the embodiments of the method shown in FIG. 2. The apparatus may be specifically applied to various electronic devices.

As shown in FIG. 6, the apparatus 600 for adjusting a parameter of the present embodiment includes: a current parameter value acquiring unit 601, a video evaluation score determining unit 602, a feature extracting unit 603, a first inputting unit 604, a second inputting unit 605, and an adjusting unit 606. The current parameter value acquiring unit 601 is configured to acquire a current value of at least one parameter, the at least one parameter being in a process of generating a video corresponding to a commentary of a news cluster based on the news cluster; the video evaluation score determining unit 602 is configured to determine a video evaluation score of the video, the video being generated based on the news cluster and according to the current value of the at least one parameter; the feature extracting unit 603 is configured to perform feature extraction on the current value of the at least one parameter, to obtain a feature representation; the first inputting unit 604 is configured to input the feature representation and the determined video evaluation score into a pre-trained evaluation network, to obtain a predicted video evaluation score; the second inputting unit 605 is configured to input the feature representation and the predicted video evaluation score into a pre-trained operation network to obtain current operation information; and the adjusting unit 606 is configured to adjust the current value of the at least one parameter based on the current operation information.

The related description of step 201, step 202, step 203, step 204, step 205, and step 206 in the corresponding embodiment of FIG. 2 maybe referred to for specific processing of the current parameter value acquiring unit 601, the video evaluation score determining unit 602, the feature extracting unit 603, the first inputting unit 604, the second inputting unit 605, and the adjusting unit 606 of the apparatus 600 for adjusting a parameter and the technical effects thereof in the present embodiment, respectively. The description will not be repeated here.

In some alternative implementations of the present embodiment, the apparatus 600 may further include: a video generating unit 607 configured to generate a video corresponding to a commentary of a target news cluster based on the current value of the at least one parameter, after the adjusting the current value of the at least one parameter.

In some alternative implementations of the present embodiment, the operation network may be obtained by pre-training through the following training: determining a network structure of an initial operation network, and initializing network parameters of the initial operation network; determining a network structure of an initial evaluation network, and initializing network parameters of the initial evaluation network; initializing the current value of the at least one parameter; executing the following parameter adjusting until a preset training termination condition is satisfied: performing feature extraction on the current value of the at least one parameter, to obtain a sample feature representation; acquiring an annotated video evaluation score corresponding to the current value of the at least one parameter, where the acquired annotated video evaluation score is a video evaluation score of the video generated based on the news cluster and according to the current value of the at least one parameter; inputting the sample feature representation and the annotated video evaluation score into the initial evaluation network, to obtain a sample predicted video evaluation score; inputting the sample feature representation and the sample predicted video evaluation score into the initial operation network, to obtain predicted operation information; adjusting the current value of the at least one parameter based on the predicted operation information; and adjusting network parameters of the evaluation network based on a difference between the sample predicted video evaluation score and the acquired annotated video evaluation score, and adjusting network parameters of the operation network with maximizing the acquired annotated video evaluation score as an optimization target; and determining the initial operation network and the initial evaluation network for use as a pre-trained operation network and a pre-trained evaluation network respectively.

In some alternative implementations of the present embodiment, the apparatus 600 may further include: a video sending unit 608 configured to send, in response to receiving a playing request for instructing to play the video corresponding to the commentary of the target news cluster sent by a terminal device, the video corresponding to the commentary of the target news cluster to the terminal device.

In some alternative implementations of the present embodiment, the apparatus 600 may further include: a controlling unit 609 configured to control, after the sending the video corresponding to the commentary of the target news cluster to the terminal device, the terminal device to present the received video.

In some alternative implementations of the present embodiment, the video evaluation score determining unit 602 may include: a watching behavior information acquiring module 6021 configured to acquire pieces of watching behavior information of at least one user watching at least one target video, where the target video is the video generated based on the news cluster and according to the current value of the at least one parameter; a first determining module 6022 configured to determine, for each piece of the acquired watching behavior information, a video evaluation score corresponding to the piece of watching behavior information; and a second determining module 6023 configured to determine an average value of each determined video evaluation score for use as the video evaluation score of the video generated based on the news cluster and according to the current value of the at least one parameter.

In some alternative implementations of the present embodiment, the watching behavior information may include at least one of the following items: a video identifier, a user identifier, a user profile, whether the video is switched on, a total video watching duration, or a video playing duration when the video is switched off.

It should be noted that the description of other embodiments in the present disclosure may be referred to for implementation details and technical effects of the units in the apparatus for adjusting a parameter according to some embodiments of the present disclosure. The description will not be repeated here.

Figure 7:
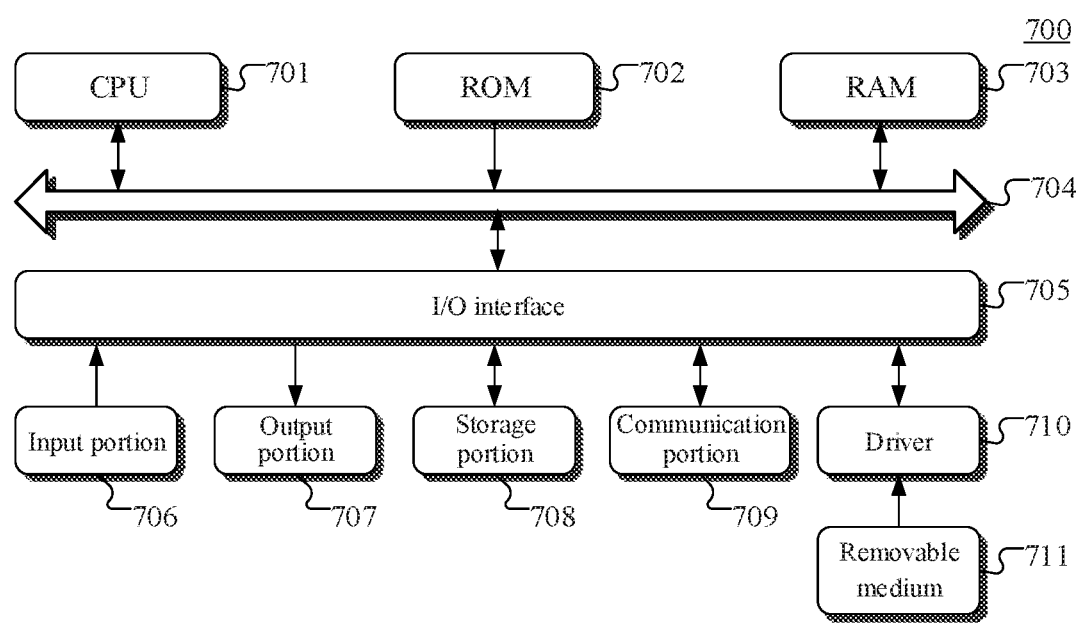
FIG. 7 is a schematic structural diagram of a computer system adapted to implement a server of some embodiments of the present disclosure.

Referring to FIG. 7 below, a schematic structural diagram of a computer system 700 adapted to implement a server of some embodiments of the present disclosure is shown. The server shown in FIG. 7 is merely an example, and should not limit the functions and scope of use of some embodiments of the present disclosure.

As shown in FIG. 7, the computer system 700 includes one or more central processing units (CPU) 701, which may execute various appropriate actions and processes in accordance with a program stored in a read only memory (ROM) 702 or a program loaded into a random access memory (RAM) 703 from a storage portion 708. The RAM 703 further stores various programs and data required by operations of the system 700. The CPU 701, the ROM 702, and the RAM 703 are connected to each other through a bus 704. An input/output (I/O) interface 705 is also connected to the bus 704.

The following components are connected to the I/O interface 705: an input portion 706 including a keyboard, a mouse, or the like; an output portion 707 including a cathode ray tube (CRT), a liquid crystal display device (LCD), a speaker, or the like; a storage portion 708 including a hard disk, or the like; and a communication portion 709 including a network interface card, such as a LAN (local area network) card and a modem. The communication portion 709 performs communication processing via a network, such as the Internet. A driver 710 is also connected to the I/O interface 705 as required. A removable medium 711, such as a magnetic disk, an optical disk, a magneto-optical disk, and a semiconductor memory, may be installed on the driver 710 as required, such that a computer program read therefrom is installed in the storage portion 708 as needed.

In particular, according to some embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 709, or may be installed from the removeable medium 711. The computer program, when executed by the central processing unit (CPU) 701, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, including a current parameter value acquiring unit, a video evaluation score determining unit, a feature extracting unit, a first inputting unit, a second inputting unit, and an adjusting unit. The names of these units or modules do not in some cases constitute a limitation to such units or modules themselves. For example, the current parameter value acquiring unit may also be described as a "unit configured to acquire a current value of at least one parameter, the at least one parameter being in a process of generating a video corresponding to a commentary of the news cluster based on a news cluster."

In another aspect, some embodiments of the present disclosure further provide a computer readable medium. The computer readable medium may be included in the apparatus described in the above embodiments, or a stand-alone computer readable medium without being assembled into the apparatus. The computer readable medium stores one or more programs. The one or more programs, when executed by the apparatus, cause the apparatus to: acquire a current value of at least one parameter, the at least one parameter being in a process of generating a video corresponding to a commentary of the news cluster based on a news cluster; determine a video evaluation score of the video, the video being generated based on the news cluster and according to the current value of the at least one parameter; perform feature extraction on the current value of the at least one parameter, to obtain a feature representation; input the feature representation and the determined video evaluation score into a pre-trained evaluation network, to obtain a predicted video evaluation score; input the feature representation and the predicted video evaluation score into a pre-trained operation network, to obtain current operation information; and adjust the current value of the at least one parameter based on the current operation information.

In still another aspect, some embodiments of the present disclosure provide another server, including: an interface; a memory storing one or more programs thereon; and one or more processors operably connected to the interface and the memory, for: acquiring a current value of at least one parameter, the at least one parameter being in a process of generating a video corresponding to a commentary of a news cluster based on the news cluster; determining a video evaluation score of the video, the video being generated based on the news cluster and according to the current value of the at least one parameter; performing feature extraction on the current value of the at least one parameter, to obtain a feature representation; inputting the feature representation and the determined video evaluation score into a pre-trained evaluation network, to obtain a predicted video evaluation score; inputting the feature representation and the predicted video evaluation score into a pre-trained operation network, to obtain current operation information; and adjusting the current value of the at least one parameter based on the current operation information.

In yet another aspect, some embodiments of the present disclosure provide a computer readable storage medium storing a computer program thereon. The computer program, when executed by one or more processors, causes the one or more processors to: acquire a current value of at least one parameter, the a least one parameter being in a process of generating a video corresponding to a commentary of the news cluster based on a news cluster; determine a video evaluation score of the video, the video being generated based on the news cluster and according to the current value of the at least one parameter; perform feature extraction on the current value of the at least one parameter, to obtain a feature representation; input the feature representation and the determined video evaluation score into a pre-trained evaluation network, to obtain a predicted video evaluation score; input the feature representation and the predicted video evaluation score into a pre-trained operation network to obtain current operation information; and adjust the current value of the at least one parameter based on the current operation information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for adjusting a parameter, comprising:
acquiring a current value of at least one parameter, the at least one parameter being in a process of generating a video corresponding to a commentary of a news cluster based on the news cluster;
determining a video evaluation score of the video, the video being generated based on the news cluster and according to the current value of the at least one parameter;
performing feature extraction on the current value of the at least one parameter, to obtain a feature representation;
inputting the feature representation and the determined video evaluation score into a pre-trained evaluation network, to obtain a predicted video evaluation score;
inputting the feature representation and the predicted video evaluation score into a pre-trained operation network, to obtain current operation information; and
adjusting the current value of the at least one parameter based on the current operation information.

2. The method according to claim 1, wherein after the adjusting the current value of the at least one parameter, the method further comprises:
   generating a video corresponding to a commentary of a target news cluster based on the current value of the at least one parameter.

3. The method according to claim 1, wherein the operation network and the evaluation network are obtained by pre-training through following training:
   determining a network structure of an initial operation network, and initializing network parameters of the initial operation network;
   determining a network structure of an initial evaluation network, and initializing network parameters of the initial evaluation network;
   initializing the current value of the at least one parameter;
   executing following parameter adjusting until a preset training termination condition is satisfied: performing feature extraction on the current value of the at least one parameter, to obtain a sample feature representation; acquiring an annotated video evaluation score corresponding to the current value of the at least one parameter, wherein the acquired annotated video evaluation score is a video evaluation score of the video generated based on the news cluster and according to the current value of the at least one parameter; inputting the sample feature representation and the annotated video evaluation score into the initial evaluation network, to obtain a sample predicted video evaluation score; inputting the sample feature representation and the sample predicted video evaluation score into the initial operation network, to obtain predicted operation information; adjusting the current value of the at least one parameter based on the predicted operation information; and adjusting network parameters of the evaluation network based on a difference between the sample predicted video evaluation score and the acquired annotated video evaluation score, and adjusting network parameters of the operation network with maximizing the acquired annotated video evaluation score as an optimization target; and
   determining the initial operation network and the initial evaluation network for use as a pre-trained operation network and a pre-trained evaluation network respectively.

4. The method according to claim 1, wherein the method further comprises:
   sending, in response to receiving a playing request for instructing to play the video corresponding to the commentary of the target news cluster sent by a terminal device, the video corresponding to the commentary of the target news cluster to the terminal device.

5. The method according to claim 4, wherein after sending the video corresponding to the commentary of the target news cluster to the terminal device, the method further comprises:
   controlling the terminal device to present the received video.

6. The method according to claim 1, wherein the determining a video evaluation score of the video, the video being generated based on the news cluster and according to the current value of the at least one parameter comprises:
   acquiring pieces of watching behavior information of at least one user watching at least one target video, wherein the target video is the video generated based on the news cluster and according to the current value of the at least one parameter;
   for each piece of the acquired watching behavior information, determining a video evaluation score corresponding to the piece of watching behavior information; and
   determining an average value of determined video evaluation scores for use as the video evaluation score of the video generated based on the news cluster and according to the current value of the at least one parameter.

7. The method according to claim 6, wherein apiece of watching behavior information may include at least one of the following items: a video identifier, a user identifier, a user profile, whether the video is switched on, a total video watching duration, or a video playing duration when the video is switched off.

8. An apparatus for adjusting a parameter, comprising:
   at least one processor; and
   a memory storing instructions, the instructions when executed by the at least one processor, cause the at least one processor to perform operations, the operations comprising:
   acquiring a current value of at least one parameter, the at least one parameter being in a process of generating a video corresponding to a commentary of a news cluster based on the news cluster;
   determining a video evaluation score of the video, the video being generated based on the news cluster and according to the current value of the at least one parameter;
   performing feature extraction on the current value of the at least one parameter, to obtain a feature representation;
   inputting the feature representation and the determined video evaluation score into a pre-trained evaluation network, to obtain a predicted video evaluation score;
   inputting the feature representation and the predicted video evaluation score into a pre-trained operation network to obtain current operation information; and
   adjusting the current value of the at least one parameter based on the current operation information.

9. The apparatus according to claim 8, wherein after the adjusting the current value of the at least one parameter, the operations further comprise:
   generating a video corresponding to a commentary of a target news cluster based on the current value of the at least one parameter, after the adjusting the current value of the at least one parameter.

10. The apparatus according to claim 8, wherein the operation network and the evaluation network are obtained by pre-training through following training:
   determining a network structure of an initial operation network, and initializing network parameters of the initial operation network;
   determining a network structure of an initial evaluation network, and initializing network parameters of the initial evaluation network;
   initializing the current value of the at least one parameter;
   executing following parameter adjusting until a preset training termination condition is satisfied: performing feature extraction on the current value of the at least one parameter, to obtain a sample feature representation;
   acquiring an annotated video evaluation score corresponding to the current value of the at least one parameter, wherein the acquired annotated video evaluation score is a video evaluation score of the video generated based on the news cluster and according to the current value of the at least one parameter; inputting the sample feature representation and the annotated video evaluation score into the initial evaluation network, to obtain a sample predicted video evaluation score; inputting the sample feature representation and the sample predicted video evaluation score into the initial operation network, to obtain predicted operation information; adjusting the current value of the at least one parameter based on the predicted operation information; and adjusting network parameters of the evaluation network based on a difference between the sample predicted video evaluation score and the acquired annotated video evaluation score, and adjusting network parameters of the operation network with maximizing the acquired annotated video evaluation score as an optimization target; and determining the initial operation network and the initial evaluation network for use as a pre-trained operation network and a pre-trained evaluation network respectively.

11. The apparatus according to claim 8, wherein the operations further comprise:

sending, in response to receiving a playing request for instructing to play the video corresponding to the commentary of the target news cluster sent by a terminal device, the video corresponding to the commentary of the target news cluster to the terminal device.

12. The apparatus according to claim 11, wherein the operations further comprise:

controlling, after the sending the video corresponding to the commentary of the target news cluster to the terminal device, the terminal device to present the received video.

13. The apparatus according to claim 8, wherein the determining a video evaluation score of the video, the video being generated based on the news cluster and according to the current value of the at least one parameter comprises:

acquiring pieces of watching behavior information of at least one user watching at least one target video, wherein the target video is the video generated based on the news cluster and according to the current value of the at least one parameter;

for each piece of the acquired watching behavior information, determining a video evaluation score corresponding to the piece of watching behavior information; and determining an average value of determined video evaluation scores for use as the video evaluation score of the video generated based on the news cluster and according to the current value of the at least one parameter.

14. The apparatus according to claim 13, wherein a piece of the watching behavior information may include at least one of the following items: a video identifier, a user identifier, a user profile, whether the video is switched on, a total video watching duration, or a video playing duration when the video is switched off.

15. A non-transitory computer readable storage medium, storing a computer program thereon, wherein the computer program, when executed by one or more processors, implements operations, the operations comprising:

acquiring a current value of at least one parameter, the at least one parameter being in a process of generating a video corresponding to a commentary of a news cluster based on the news cluster;

determining a video evaluation score of the video, the video being generated based on the news cluster and according to the current value of the at least one parameter;

performing feature extraction on the current value of the at least one parameter, to obtain a feature representation;

inputting the feature representation and the determined video evaluation score into a pre-trained evaluation network, to obtain a predicted video evaluation score;

inputting the feature representation and the predicted video evaluation score into a pre-trained operation network, to obtain current operation information; and adjusting the current value of the at least one parameter based on the current operation information.

16. The medium according to claim 15, wherein after the adjusting the current value of the at least one parameter, the operations further comprise:

generating a video corresponding to a commentary of a target news cluster based on the current value of the at least one parameter.

17. The medium according to claim 15, wherein the operation network and the evaluation network are obtained by pre-training through following training:

determining a network structure of an initial operation network, and initializing network parameters of the initial operation network;

determining a network structure of an initial evaluation network, and initializing network parameters of the initial evaluation network;

initializing the current value of the at least one parameter;

executing following parameter adjusting until a preset training termination condition is satisfied: performing feature extraction on the current value of the at least one parameter, to obtain a sample feature representation; acquiring an annotated video evaluation score corresponding to the current value of the at least one parameter, wherein the acquired annotated video evaluation score is a video evaluation score of the video generated based on the news cluster and according to the current value of the at least one parameter; inputting the sample feature representation and the annotated video evaluation score into the initial evaluation network, to obtain a sample predicted video evaluation score; inputting the sample feature representation and the sample predicted video evaluation score into the initial operation network, to obtain predicted operation information; adjusting the current value of the at least one parameter based on the predicted operation information; and adjusting network parameters of the evaluation network based on a difference between the sample predicted video evaluation score and the acquired annotated video evaluation score, and adjusting network parameters of the operation network with maximizing the acquired annotated video evaluation score as an optimization target; and determining the initial operation network and the initial evaluation network for use as a pre-trained operation network and a pre-trained evaluation network respectively.

18. The medium according to claim 15, wherein the operations further comprise:

sending, in response to receiving a playing request for instructing to play the video corresponding to the commentary of the target news cluster sent by a terminal device, the video corresponding to the commentary of the target news cluster to the terminal device.

19. The medium according to claim 15, wherein after sending the video corresponding to the commentary of the target news cluster to the terminal device, the operations further comprise:

controlling the terminal device to present the received video.

20. The medium according to claim 15, wherein determining a video evaluation score of the video, the video being generated based on the news cluster and according to the current value of the at least one parameter comprises:
acquiring pieces of watching behavior information of at least one user watching at least one target video, wherein the target video is the video generated based on the news cluster and according to the current value of the at least one parameter;
for each piece of the acquired watching behavior information, determining a video evaluation score corresponding to the piece of watching behavior information; and
determining an average value of determined video evaluation scores for use as the video evaluation score of the video generated based on the news cluster and according to the current value of the at least one parameter.

* * * * *